(12) United States Patent
Ko (10) Patent No.: US 9,627,869 B2
(45) Date of Patent: Apr. 18, 2017

(54) BLOCK FOR VEHICLE

(71) Applicant: KOREA ELECTRIC TERMINAL CO., LTD., Incheon-si (KR)

(72) Inventor: Kyoung-Ho Ko, Incheon-si (KR)

(73) Assignee: KOREA ELECTRIC TERMINAL CO., LTD., Incheon (KR)

(*) Notice: Subject to any disclaimer, the term of this patent is extended or adjusted under 35 U.S.C. 154(b) by 0 days.

(21) Appl. No.: 14/978,368

(22) Filed: Dec. 22, 2015

(65) Prior Publication Data

US 2016/0190784 A1  Jun. 30, 2016

(30) Foreign Application Priority Data

Dec. 24, 2014 (KR) .................. 10-2014-0189100

(51) Int. Cl.
*H02G 3/08* (2006.01)
*B60R 16/023* (2006.01)
*H02G 3/16* (2006.01)

(52) U.S. Cl.
CPC ......... *H02G 3/081* (2013.01); *B60R 16/0238* (2013.01); *H02G 3/16* (2013.01)

(58) Field of Classification Search
USPC .................................................. 174/50, 60
See application file for complete search history.

(56) References Cited

U.S. PATENT DOCUMENTS

| | | | | |
|---|---|---|---|---|
| 6,664,472 B2* | 12/2003 | Saneto | ..................... | H02G 3/16 174/66 |
| 7,777,132 B2* | 8/2010 | Ozawa | ..................... | H02G 3/14 174/135 |
| 8,927,860 B2* | 1/2015 | Yamamoto | ............... | H02G 3/22 174/50 |

FOREIGN PATENT DOCUMENTS

| | | |
|---|---|---|
| KR | 10-0814929 B1 | 3/2008 |
| KR | 20-0439074 Y1 | 3/2008 |
| KR | 10-2013-0008726 A | 1/2013 |

\* cited by examiner

*Primary Examiner* — Dhirubhai R Patel
(74) *Attorney, Agent, or Firm* — Novick, Kim & Lee, PLLC; Jae Youn Kim (57) ABSTRACT

Provided is a block for a vehicle. The block for a vehicle includes a main housing, an upper housing, support bars, and temporary fastening portions. The main housing has a first containing space. The upper housing has a second containing space. At least part of the upper housing is inserted into the main housing. The support bars protrude upward from edges of the main housing, and are elastically deformable in a direction away from the main housing. The temporary fastening portions protrude downward from edges of the upper housing. When the temporary fastening portions are seated on the upper portions of the support bars, the upper housing is temporarily fastened to the main housing. When the support bars are elastically deformed, the temporary fastening portions exit the state of being seated on the upper portions of the support bars, and thus the temporary fastening is released.

10 Claims, 9 Drawing Sheets

BLOCK FOR VEHICLE

BACKGROUND

1. Technical Field

The present invention relates generally a block for a vehicle, and more particularly to a block for a vehicle, which contains a plurality of electric/electronic parts, such as a terminal, and performs various electrical connection functions inside a vehicle.

2. Description of the Related Art

A block for a vehicle includes various parts. For example, various types of multiple parts, such as fuses, relays and terminals, are provided inside a block for a vehicle, electrically connect the inside and outside of the block for a vehicle, and enable the block for a vehicle to perform various functions.

For a block for a vehicle, a plurality of housing parts, such as a fuse plate into which fuses are inserted, a main block in which terminals and connectors are mounted, and a lower case and an upper case, is assembled into a single block for a vehicle.

Meanwhile, a plurality of smaller-sized parts, such as terminals, is mounted inside a block for a vehicle. There is concern that smaller-sized electric/electronic parts, such as a terminal, may be bent or damaged due to interference when housing parts, such as a fuse plate, a main block, etc., constituting a block for a vehicle are assembled together.

In particular, with the development of the electronic control technology of automobiles, the number of electric/electronic parts mounted in a block for a vehicle increases, and thus a plurality of electric/electronic parts are mounted in the block for a vehicle at considerable small pitches. Accordingly, possibility that electric/electronic parts are damaged during the assembly of a block for a vehicle is further increased.

In order to overcome this problem, there has been disclosed a technology in which after electric/electronic parts have been inserted in the state in which the housing parts of a block for a vehicle had been temporarily assembled, the housing parts are completely assembled, thereby enabling the electric/electronic parts to be naturally and completely assembled. However, this technology has a problem in that it is difficult to temporarily assemble the housing parts or in that complete assembly is undesirably performed by external force in a temporarily assembled state.

Furthermore, in the case of the conventional technology, to order to insert small-sized electric/electronic parts, such as a terminal, into housing parts, the small-sized electric/electronic parts need to be passed through the narrow mounting spaces of the housing parts, and thus the efficiency of the assembly of the parts are degraded. If the mounting spaces are increased, another problem occurs in that the electric/electronic parts move within the mounting spaces.

PRECEDING TECHNOLOGY DOCUMENT

Patent Document

Korean Patent No. 10-0814929

SUMMARY

The present invention is intended to overcome the above problems of the conventional technology, and an object of the present invention is to enable the temporarily assembled state of a main housing and an upper housing, constituting a block for a vehicle, to be securely maintained.

Another object of the present invention is to enable terminals to be easily inserted into a block for a vehicle and also prevent the terminal from moving within the block for a vehicle.

According to an aspect of the present invention, there is provided a block for a vehicle, including: a main housing configured such that a first containing space in which a plurality of parts is mounted is formed therein; an upper housing configured such that at least part thereof is inserted into the main housing and a second containing space in which a plurality of parts is mounted is formed therein; support bars configured to protrude upward from edges of the main housing surrounding the upper housing, and to be elastically deformable in a direction away from the main housing; and temporary fastening portions configured to protrude downward from edges of the upper housing, and configured such that one end of each of the temporary fastening portions is selectively seated on the upper portion of a corresponding one of the support bars; wherein, when the temporary fastening portions are seated on the upper portions of the support bars, the upper housing is temporarily fastened to the main housing, and, when the support bars are elastically deformed, the temporary fastening portions exit the state of being seated on the upper portions of the support bars, and thus the temporary fastening is released.

The support bars may be provided with respective support protrusions protruding in a direction toward the center of the main housing, the temporary fastening portions may be provided with respective temporary fastening protrusions in a direction away from the upper housing, and thus the upper housing may be temporary fastened to the main housing when the temporary fastening protrusions are seated on the support protrusions.

At least part of each of the support bars may be surrounded with an interference prevention portion provided on an outer surface of the main housing.

Elastically deformable fastening tabs may be provided on edges of the main housing, fastening portions configured to be selectively hooked by the fastening tabs may protrude from the upper housing, the main housing and the upper housing may be secondarily fastened to each other when the fastening portions are hooked by the fastening tabs, and the location at which the fastening portions are hooked by the fastening tabs may be formed to be closer to the bottom of the main housing than the location at which the temporary fastening portions are caught on the support bars.

The fastening tabs may be provided on the sides of the main housing on which the support bars are not provided, and the fastening portions may be provided on the sides of the upper housing on which the temporary fastening portions are not provided.

First reception holes may be formed in the main housing, second reception holes may be formed in the upper housing, the first reception holes may communicate with the second reception holes, and a temporary fastening projection configured such that the lance of an electric/electronic part is caught and temporarily fastened in a state in which the temporary fastening portions have been caught on the support bars may be provided on one side of each of the second reception holes.

A support member configured to support the body of an electric/electronic part may be provided on an edge of one side of each of the first reception holes, and may support and fasten one side of the body of the electric/electronic part when the fastening portions are hooked by the fastening tabs.

A support member configured to support a body of an electric/electronic part may be provided on an edge of one side of each of the first reception holes which is open toward the upper housing, and the support member may protrude above the open exit of the first reception hole and may also protrude in a direction in which the support member reduces the width of the first reception hole.

The cross section of the first reception holes may be formed in a square shape, and a support member provided on one side of each of the first reception holes may be formed to have a width equal to or larger than that of a body of the electric/electronic part.

An inclined guide surface may be formed on the lower surface of each of the support members located inside the first reception holes, and may guide the electric/electronic part along the inner surface of a corresponding one of the first reception holes.

A bus bar may be mounted on the bottom of the upper housing, and a bus bar shield portion may be provided on the main housing and shield the bus bar so that the bus bar is not exposed.

A connector assembly portion may be formed in a corner portion of the main housing, and may be open downward in a direction in which the main housing and the upper housing are assembled together.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

Figure 1:
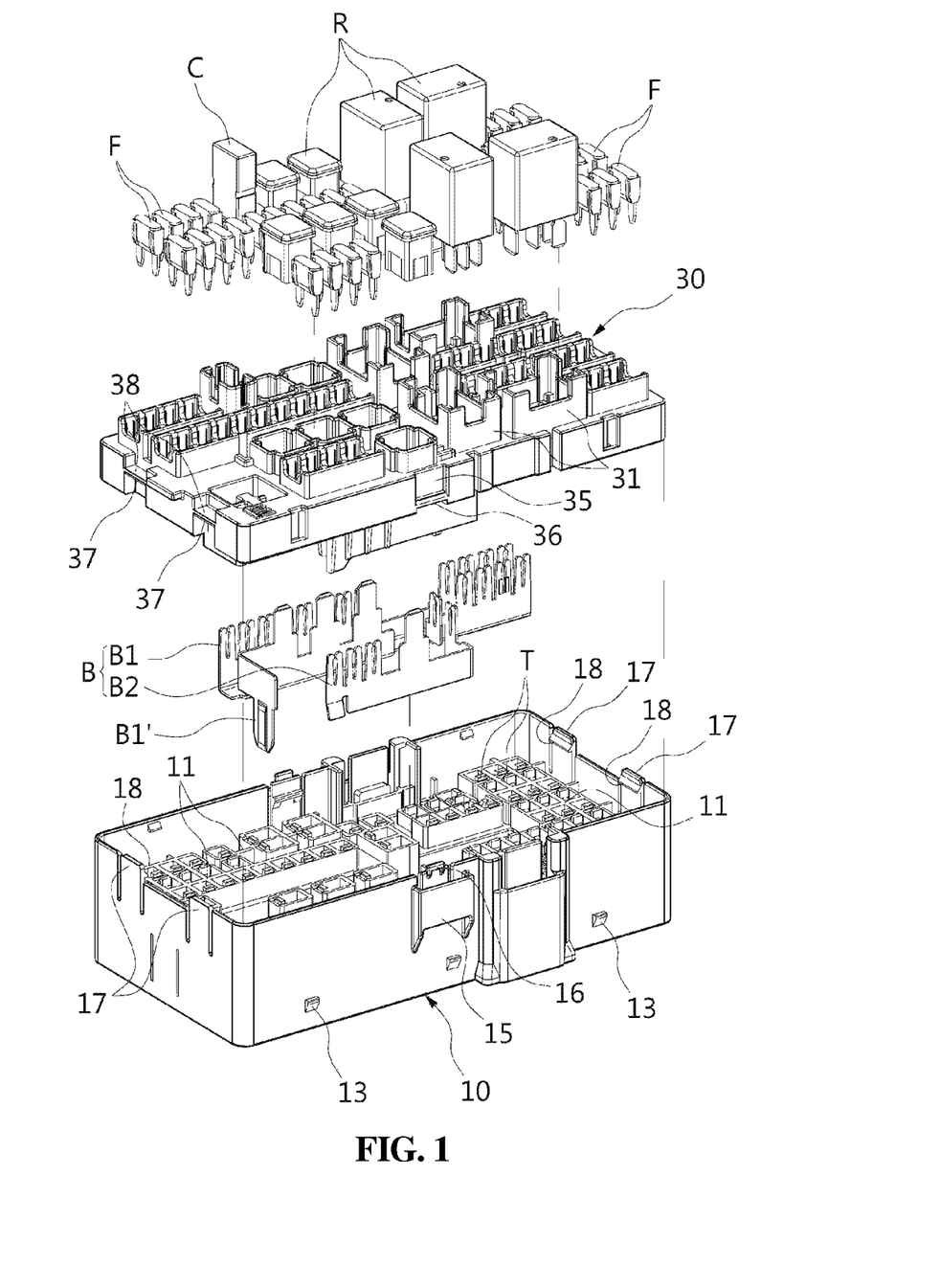
FIG. 1 is an exploded perspective view showing the configuration of a block for a vehicle according to an embodiment of the present invention.
Figure 2:
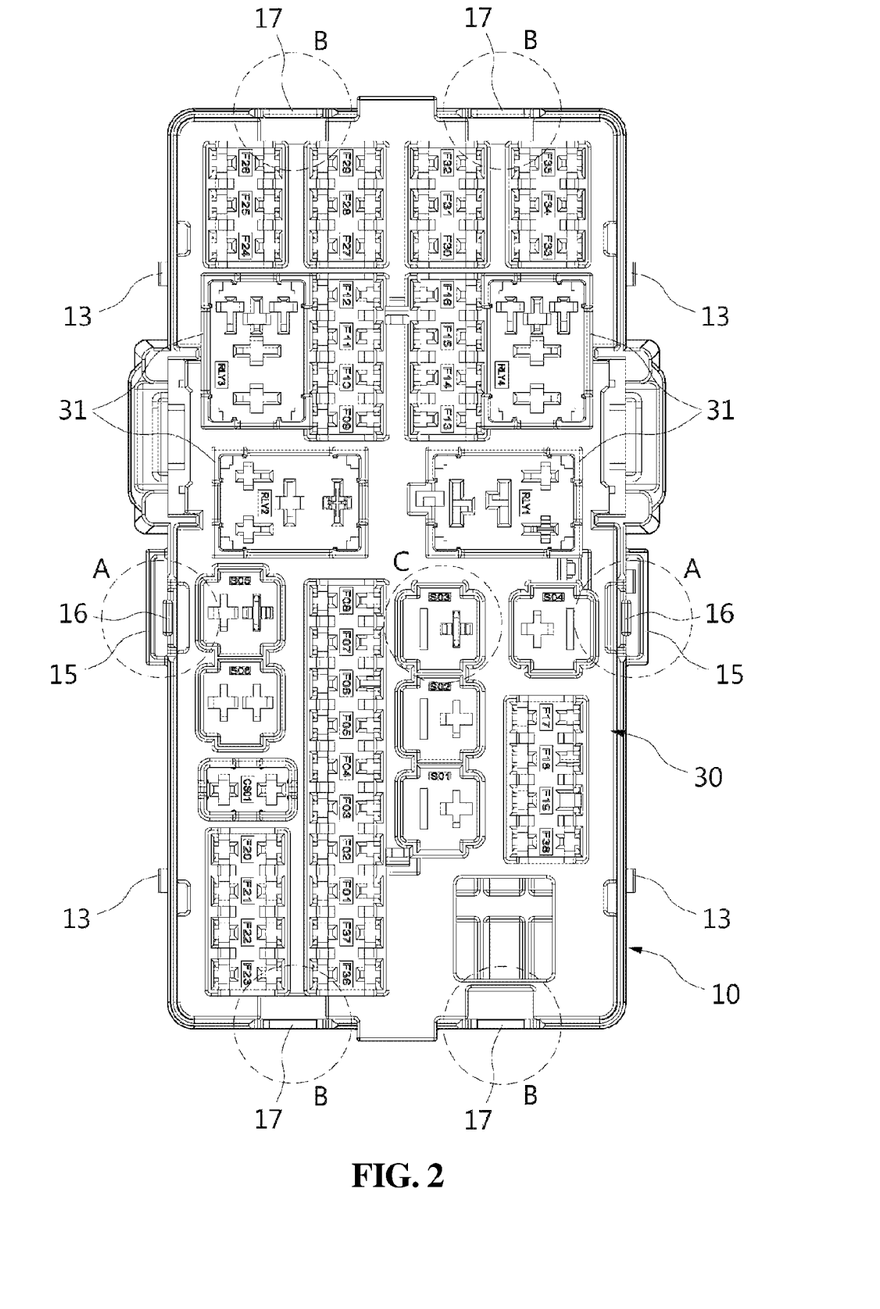
FIG. 2 is a plan view showing the configuration of an embodiment of the present invention.

As shown in FIGS. 1 and 2, a block for a vehicle according to the present invention is formed in an approximately hexahedral shape. A plurality of parts is assembled into a single block.

The block for a vehicle according to the present invention is configured to basically include a main housing 10, an upper housing 30 coupled to the upper portion of the main housing 10, and a lower housing (not shown) coupled to the lower portion of the main housing 10.

The main housing 10 and upper housing 30 include a plurality of electric/electronic parts. These electric/electronic parts may include bus bars B1 and B2, terminals T, connectors (not shown), fuses F, relays R, a circuit breaker C, mini-fuses F, etc. In the present embodiment, the fuses F and relays R are coupled to the upper portion of the upper housing 30.

First, the main housing 10 is described. The main housing 10 is formed in an approximately hexahedral three-dimensional shape. A first containing space 11 is formed in the upper and lower portions of the main housing 10. A plurality of electric/electronic parts are inserted into and fastened in the first containing space 11. A plurality of first reception holes 11' (see FIGS. 5(a) and 7(a)) is formed in the first containing space 11. The first reception holes 11' are portions into which electric/electronic parts are inserted, and may be formed to be open in a vertical direction or in any one direction. The first reception holes 11' and support members 12a provided in the first reception holes 11' will be described in detail below.

A plurality of assembly protrusions 13 is provided to protrude from the outer surfaces of the main housing 10. The plurality of assembly protrusions 13 protrudes from the outer surfaces of the main housing 10, and are engaged with the assembly hooks (not shown) of the lower housing, thereby enabling the main housing 10 and the lower housing to be coupled to each other.

Figure 3A:
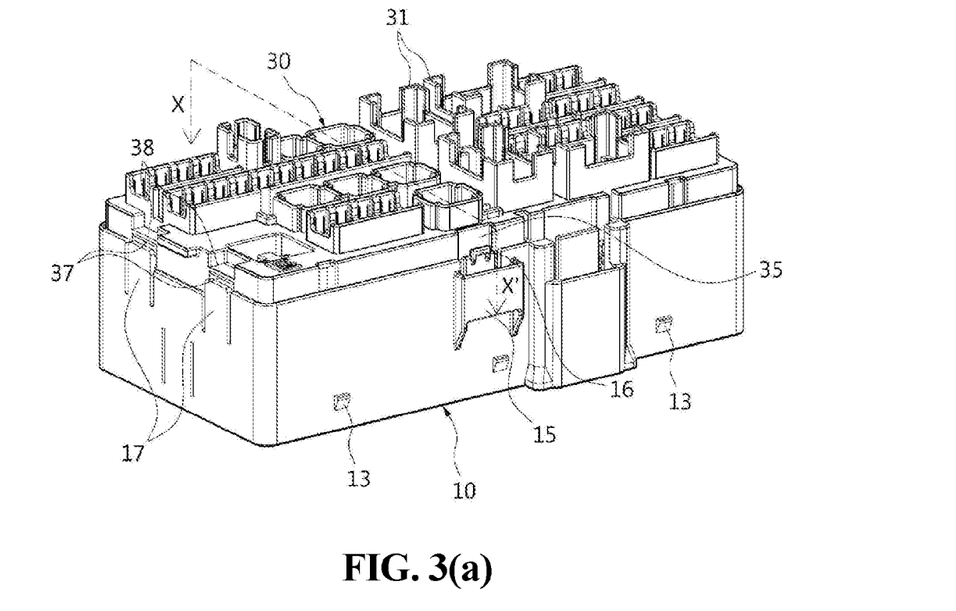
FIGS. 3(a) and 3(b) are perspective views showing the states in which a main housing and a upper housing constituting the embodiment of the present invention are temporarily assembled and secondarily assembled, respectively.
Figure 4A:
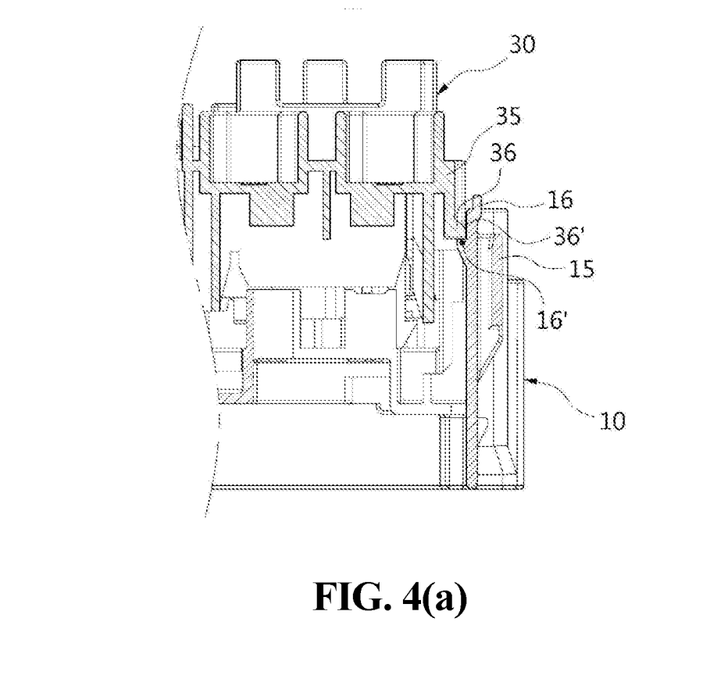
FIGS. 4(a) and 4(b) are sectional views taken along line X-X' of FIG. 3(a) and line Y-Y' of FIG. 3(b), respectively.

The main housing 10 is provided with support bars 16. The support bars 16 are provided in edges of the main housing 10, and are elastically deformable. As shown in FIGS. 1, 3(a) and 4(a), the support bars 16 have an approximately cantilever shape, and protrude in the direction of the upper housing 30. Accordingly, the support bars 16 are deformable in outward directions away from the main housing 10.

The support bars 16 are provided on outer surfaces of the main housing 10 that surround the upper housing 30. Accordingly, an operation in which the support bars 16 are elastically deformed in the directions away from the main housing 10 may be performed without interference with the upper housing 30.

A support protrusion 16' is provided at one end of each of the support bars 16. The support protrusion 16' protrudes from the support bar 16 to the center of the main housing 10. The temporary fastening protrusions 36 (which will be described below) of the upper housing 30 are selectively seated on the support protrusions 16', and thus the main housing 10 and the upper housing 30 are fastened. Although the support bars 16 are illustrated as being provided on both sides of the main housing 10, respectively, in FIG. 1, a single support bar may be provided on any one of both sides of the main housing 10, or three or more support bars may be provided. In the following description, the state in which temporary fastening portions 35 are caught on the support bars 16 is referred to as a "temporarily fastened state."

At least part of each of the support bars 16 is surrounded with an interference prevention portion 15 provided on an outer surface of the main housing 10. The interference prevention portion 15 functions to prevent the support bar 16 from being undesirably pressed by external force, and is formed surround at least part of the support bar 16. It will be apparent that the interference prevention portion 15 also functions to prevent the support bar 16 from being excessively and elastically deformed in a direction away from the main housing 10.

The main housing 10 is provided with fastening tabs 17. The fastening tabs 17 are provided at edges of the main housing 10, more accurately sides of the main housing 10, and are elastically deformable. The fastening tabs 17 hook the fastening portions 37 (which will be described below) of the upper housing 30, and function to prevent the upper housing 30 from being separated in a direction away from the main housing 10. In the following description, the coupling between the fastening tabs 17 and the fastening portions 37 is referred to as "secondarily assembly."

Figure 4B:
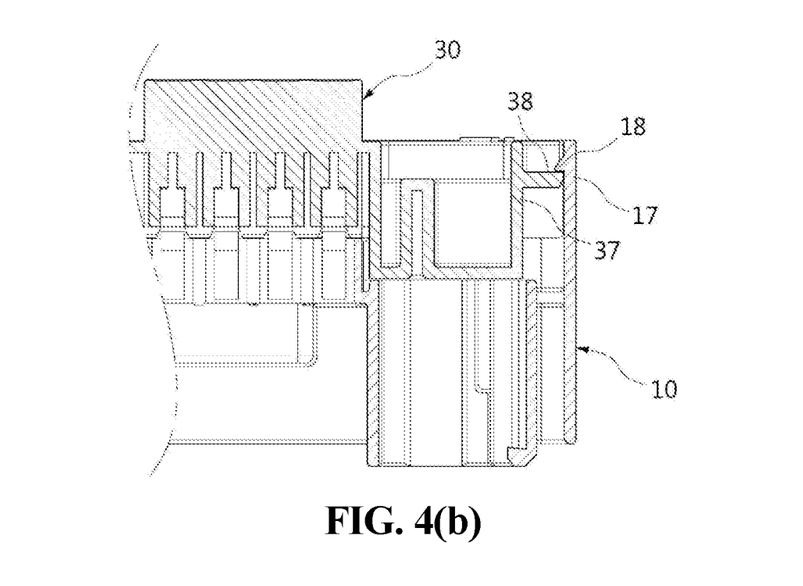

As shown in FIGS. 1 and 4(b), a fastening protrusion 18 protrudes from each of the fastening tabs 17 in a direction toward the center of the main housing 10 and a direction away from toward the outer surface of the upper housing 30. Furthermore, the fastening portions 37 (which will be described below) of the upper housing 30 are hooked by the fastening tabs 17, and prevent the upper housing 30 from being separated upward, i.e., a direction away from the main housing 10.

The fastening tabs 17 have a cantilever shape and are elastically deformable, like the support bars 16. Accordingly, when the fastening tabs 17 are elastically deformed in a direction away from the center of the main housing 10, the coupling between the fastening tabs 17 and the fastening portions 37 may be released.

Preferably, the fastening tabs 17 are provided on the sides of the main housing 10 on which the support bars 16 are not provided. The reason for this is to enable the temporary fastening using the support bars 16 and the secondary assembly using the fastening tabs to be distinguished from each other. For reference, in the present embodiment, two fastening tabs 17 are provided on each of two opposite sides of the main housing 10. That is, a total of four fastening tabs are provided.

Figure 5A:
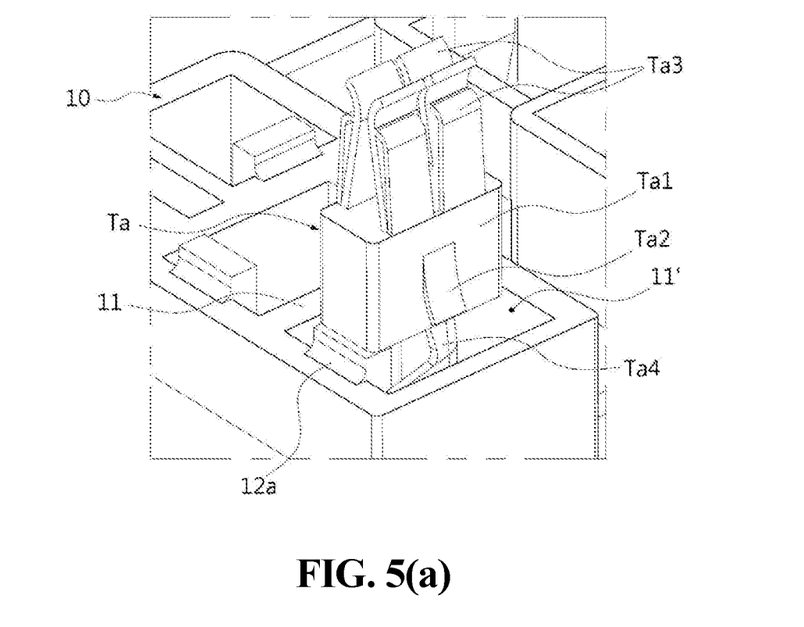
FIG. 5(a) is a perspective view showing the configuration of a first reception hole of a main housing, constituting part of an embodiment of the present invention, and the configuration of a terminal mounted in the first reception hole.
Figure 7A:
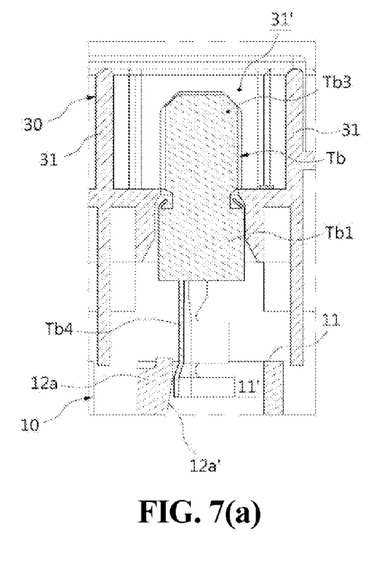
FIGS. 7(a) and 7(b) are sectional views taken along lines I-I' and II-II' of FIG. 6, respectively.

Referring to FIGS. 5(a) and 7(a), the plurality of first reception holes 11' are included in the first containing space 11. The first reception holes 11' are portions into which electric/electronic parts are inserted. The first reception holes 11' may be formed to be open in a vertical direction or in any one direction.

The support member 12a is provided in each of the first reception holes 11.' The support member 12a protrudes from the edge of the first reception hole 11.' The support member 12a catches the body of an electric/electronic part, for example, a terminal, and functions to prevent the electric/electronic part from being separated from the first reception hole 11.' For reference, the support member 12a is illustrated in FIGS. 5(a) and 7(a).

Figure 6:
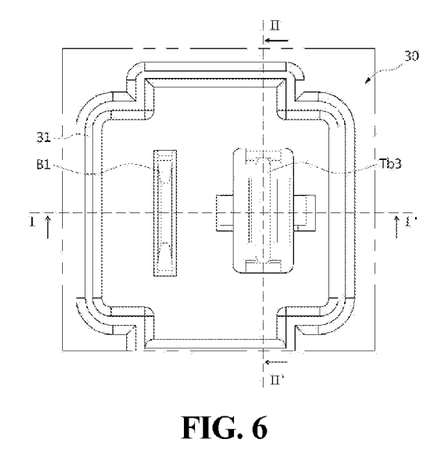
FIG. 6 is a plan view showing the configuration of the important portion of the upper housing corresponding to region C of FIG. 2.
Figure 7B:
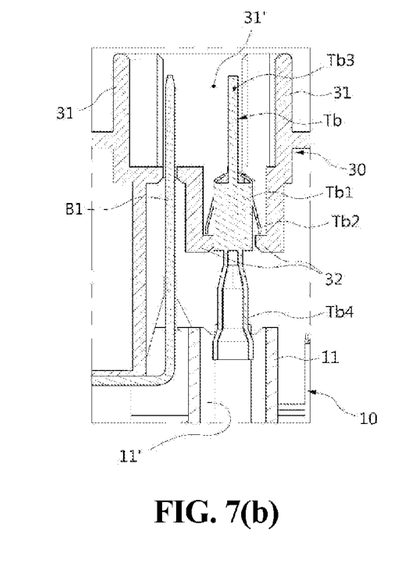
Figure 8:
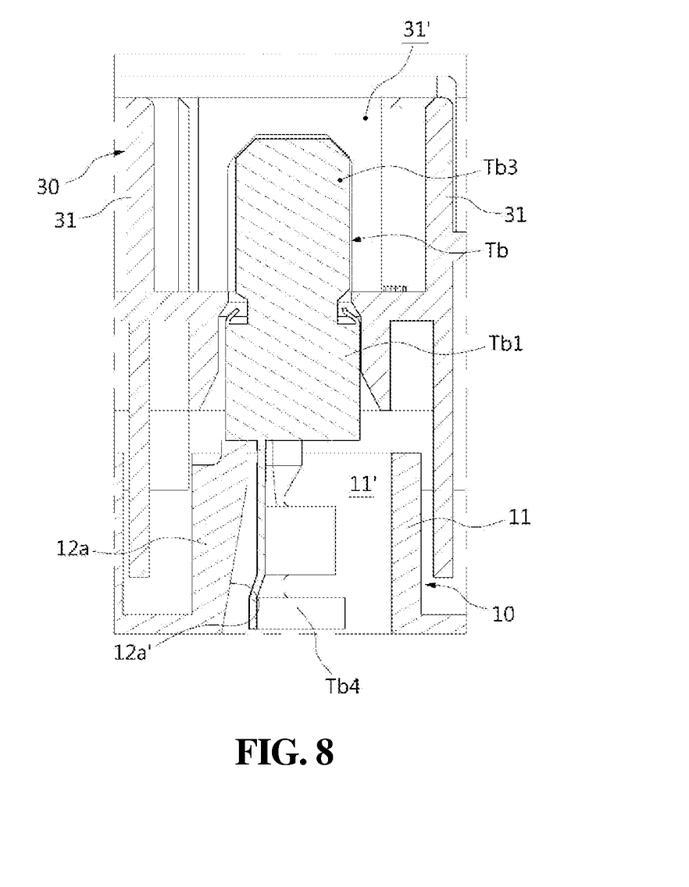
FIG. 8 is a sectional view, taken along line II-II' of FIG. 6, showing the structures of a first reception hole and a second reception hole in the state in which a main housing and an upper housing constituting an embodiment of the present invention are secondarily assembled.

For ease of description, the terminals T of the electric/electronic parts are described in brief. FIG. 5(a) shows a first terminal Ta, and FIGS. 6 to 8 show a second terminal Tb. Although these are distinguished for convenience of description, they may have the same structure. For example, the first terminal Ta is configured to include a terminal body Ta1, first and second connection members Ta3 and Ta4 configured to protrude both sides of the terminal body Ta1 and be connected to a counterpart terminal or wire, and a lance Ta2 configured to protrude from the body, to be elastically deformable, and to be caught on the temporary fastening projection 32 of the second reception hole 31.' The second terminal Tb also has the same structure. In the following description, first, the first terminal Ta is described as an example.

The support member 12a protrudes from one side edge of the first reception hole 11' that is open toward the upper housing 30, and functions to catch one end of the body of the first terminal Ta and thus fasten the first terminal Ta. As shown in FIG. 8, when the main housing 10 and the upper housing 30 are secondarily assembled, one end of the body Ta1 of the first terminal Ta inserted through the first reception hole 11' and protruding upward is seated on the support member 12a, and thus the first terminal Ta is fastened without being separated through the first reception hole 11.'

As shown in FIG. 5(a), the cross section of the first reception hole 11' of the main housing 10 is formed in a square shape. In this case, the cross section of the first reception hole 11' is formed to be larger than the width of the electric/electronic part, a lance channel through which the lance Ta2 of the first terminal Ta passes, etc. are omitted, and thus the electric/electronic part may be easily inserted without interference with the inner wall of the first reception hole 11.'

Furthermore, the support member 12a is provided on one side edge of the first reception hole 11' that is open toward the upper housing 30. Accordingly, the first terminal Ta interferes with the support member 12a after almost being inserted into the first reception hole 11,' and is then guided without being tilted to one side of the first reception hole 11.' After the first terminal Ta has been sufficiently inserted into the first reception hole 11,' the body Ta1 of the first terminal Ta may be caught on the support member 12a, and separation in the opposite direction is somewhat prevented. When the first terminal Ta continues to move and enter the second reception hole 31,' the first terminal Ta is caught on the temporary fastening projection 32 and temporarily fastened.

Figure 5B:
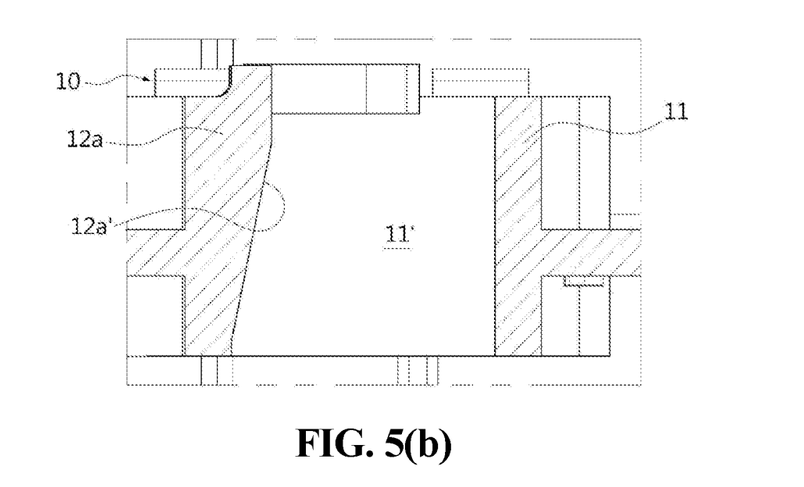
FIG. 5(b) is a sectional view showing the internal configuration of a first reception hole of a main housing constituting part of an embodiment of the present invention.

As shown in FIG. 5(b), an inclined guide surface 12a' is formed on the lower surface of the support member 12a located inside the first reception hole 11,' and thus the first terminal Ta is naturally guided toward one side while moving along the inner surface of the first reception hole 11.'

Furthermore, the support member 12a is formed to have a width greater than or equal to the body of the first terminal Ta. Accordingly, when the main housing 10 and the upper housing 30 are secondarily assembled, the body of the first terminal Ta is supported by the support member 12a, and thus can be maintained in the state of being stably caught without movement.

Referring to FIGS. 7(a) and 7(b), the support member 12a is provided in the first reception hole 11.' As described above, when the main housing 10 and the upper housing 30 are secondarily assembled, the support member 12a supports the electric/electronic part (terminal), and thus prevents the electric/electronic part from being separated from the first reception hole 11.' Since FIGS. 7(a) and 7(b) show the state in which the main housing 10 and the upper housing 30 are temporarily assembled, this state is a state that is present before the support member 12a supports the electric/electronic part (terminal).

Figure 9:
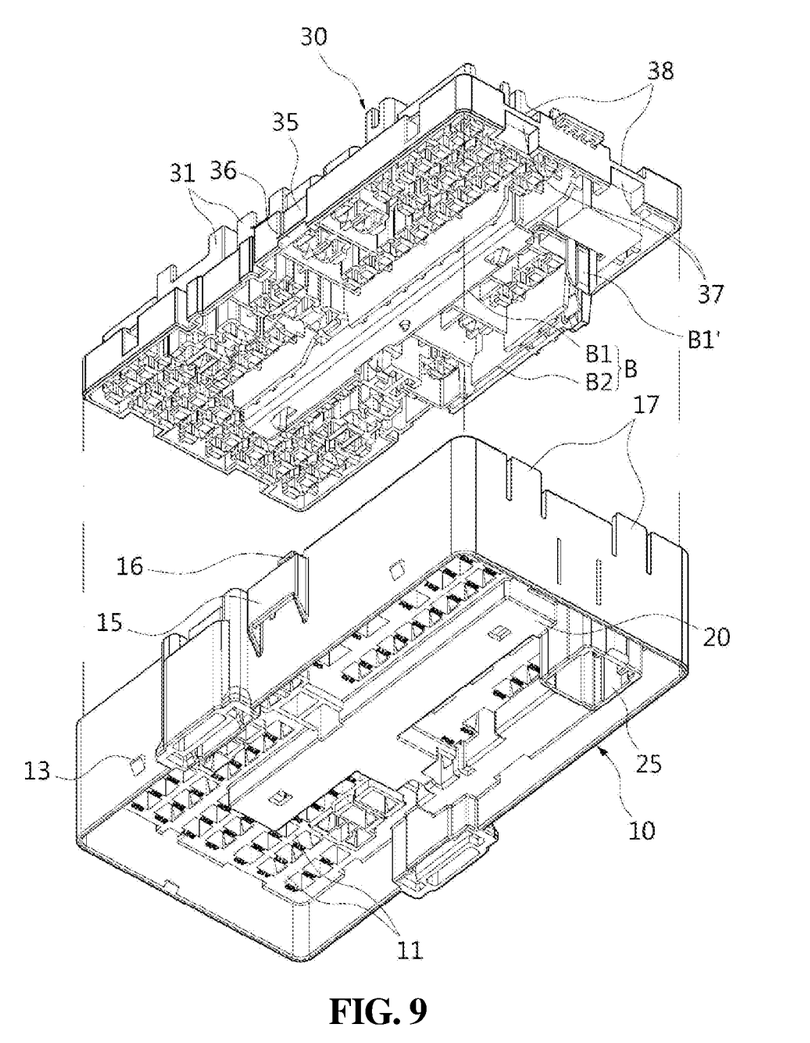
FIG. 9 is an exploded perspective view showing the configurations of a main housing and an upper housing constituting an embodiment of the present invention when viewed from above.

Referring to FIG. 9, a bus bar shield portion 20 is provided on the bottom of the main housing 10. The bus bar shield portion 20 is a portion that shields the bus bars B1 and B2 disposed between the upper housing 30 and the main housing 10 in order to prevent the bus bars B1 and B2 from being exposed to the outside. For this purpose, the bus bar shield portion 20 protrudes in a shape corresponding to the shape of the bus bars B1 and B2, and surrounds the bus bars B1 and B2. For reference, in the present embodiment, the bus bars B1 and B2 are composed of two bus bars, i.e., a first bus bar B1 and a second bus bar B2.

Figure 10:
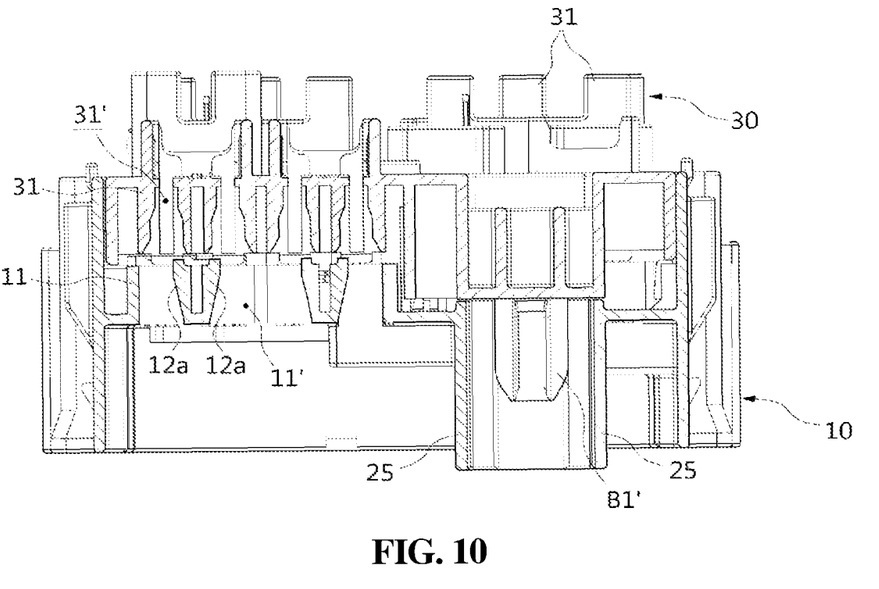
FIG. 10 is a sectional view showing the configuration of an embodiment of the present invention.

As shown in FIG. 10, a connector assembly portion 25 that is open downward in the direction of the assembly of the main housing 10 and the upper housing 30 is formed in the corner portion of the main housing 10. A separate connector is assembled in the connector assembly portion 25. Since the connector assembly portion 25 is provided in the main housing 10 whose height is higher than that of the upper housing 30, resistance to bending or broadening.

Although not shown, the main housing 10 and the upper housing may be provided with corresponding separation prevention portions. The separation prevention portions are portions that prevent the upper housing 30 from being separated upward in the state in which the main housing 10 and the upper housing 30 are temporarily assembled. For example, a protrusion structure is provided in the main housing 10, and a recess structure is provided in the upper housing 30, thereby forming a pair of separation prevention portions.

Next, the upper housing 30 is described. The upper housing 30 is formed in an approximately hexahedral 3D shape. A second containing space 31 is formed in the upper and lower portions of the upper housing 30. A plurality of electric/electronic parts, such as fuses F and relays R, is inserted into and fastened in the second containing space 31.

At least part of the upper housing 30 may be inserted into and surround with the main housing 10. In the present embodiment, the sides of the upper housing 30 are surrounded with the main housing 10, as shown in FIG. 3(a).

A plurality of second reception holes 31' (see FIGS. 5(a) and 5(b)) is formed in the second containing space 31. The second reception holes 31' are portions into which electric/electronic parts are inserted. The second reception holes 31' are formed to be open in a vertical direction or in any one direction. The second reception holes 31' may communicate with the above-described first reception holes 11' of the main housing 10.

As shown in FIG. 1, temporary fastening portions 35 are provided on outer surfaces of the upper housing 30. The temporary fastening portions 35 protrude downward from the edges of the upper housing 30. One end of each of the temporary fastening portions 35 is selectively seated on the upper portion of a corresponding support bar 16, thereby enabling temporary fastening between the main housing 10 and the upper housing 30.

More accurately, a temporary fastening protrusion 36 protrudes from the temporary fastening portion 35 in a direction away from the upper housing 30. Accordingly, when the temporary fastening protrusion 36 is seated on the support protrusion 16,' the upper housing 30 is temporarily fastened to the main housing 10.

Accordingly, when the temporary fastening portion 35 is seated on the upper portion of the support bar 16, the upper housing 30 is temporarily fastened to the main housing 10. Meanwhile, when the support bar 16 is elastically deformed, the temporary fastening portion 35 exist the state of being seated on the upper portion of the support bar 16, and thus the temporary fastening is released.

Fastening portions 37 are provided on outer surfaces of the upper housing 30. The fastening portion 37s are portions that are selectively hooked by the fastening tabs 17. As shown in FIG. 1, the fastening portions 37 may protrude from outer surfaces of the upper housing 30 in the form of ribs. When the fastening portions 37 are hooked by the fastening tab 17, the main housing 10 and the upper housing 30 are secondarily fastened. Reference symbol 38 denotes fastening ribs that protrude from the fastening portions 37.

In this case, the location at which the fastening portion 37 is hooked by the fastening tab 17 is lower than the location at which the temporary fastening portion 35 is hooked by the support bar 16. That is, the location at which the fastening portion 37 is hooked by the fastening tab 17 is closer to the bottom surface of the main housing 10. Accordingly, in order to switch from the temporary fastening state to the secondary assembly state, the main housing 10 and the upper housing 30 needs to come into close contact in a direction in which the distance therebetween decreases.

Preferably, the fastening portions 37 are provided on the sides of the upper housing 30 on which the temporary fastening portions 35 are not provided. The reason for this is to enable the temporary fastening using the support bars 16 and the secondary assembly using the fastening tabs 17 to be distinguished from each other. For reference, in the present embodiment, two fastening portions 37 are provided on each of two opposite sides of the upper housing 30. That is, a total of four fastening portions are provided.

As shown in FIG. 7(b), a temporary fastening projection 32 on and to which the lance Ta2 of the first terminal Ta, i.e., an electric/electronic part, is caught and temporarily fastened is provided in one side of the second reception hole 31.' The temporary fastening projection 32 protrudes in a direction toward the center of the second reception hole 31,' and catches the lance Ta2 of the first terminal Ta in the state in which the temporary fastening portion 35 is caught on the support bar 16, thereby temporarily fastening the first terminal Ta in the second reception hole 31.'

A process of assembling a block for a vehicle according to the present invention will be described in detail below with reference to the accompanying drawings.

Figure 3B:
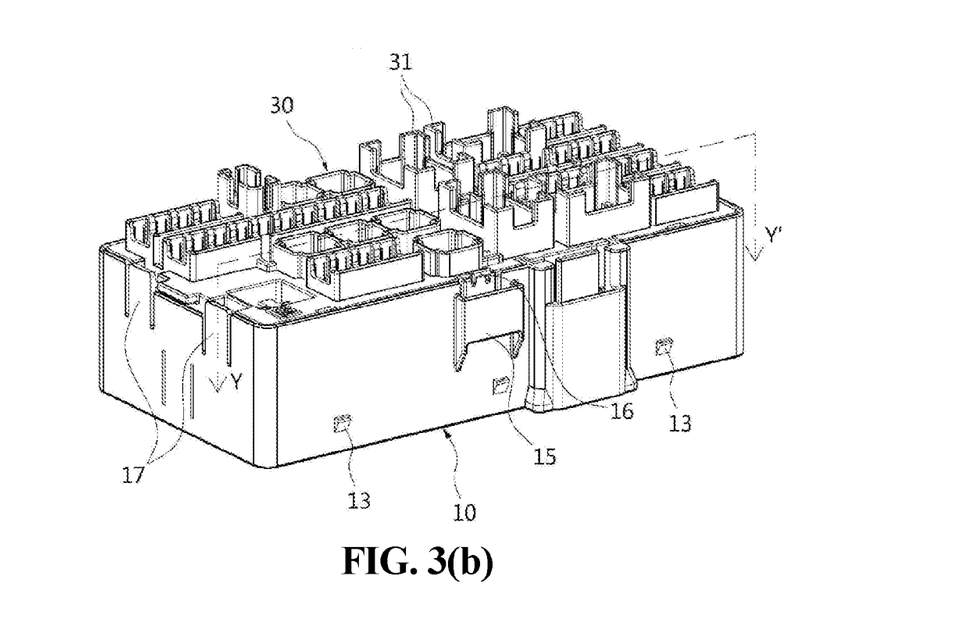

FIGS. 3(a) and 3(b) show the states in which the main housing and the upper housing 30 constituting the embodiment of the present invention are temporarily assembled and secondarily assembled, and FIGS. 4(a) and 4(b) are sectional views taken along line X-X' of FIG. 3(a) and line Y-Y' of FIG. 3(b).

First, the temporary assembly of the main housing 10 and the upper housing 30 is described. When a worker inserts the upper housing 30 into the main housing 10, part of the upper housing 30 is surrounded with the main housing 10.

In this process, the temporary fastening portion 35 of the upper housing 30 is seated on the support bar 16 of the main housing 10, and thus the upper housing 30 does not move in the direction of the main housing 10 any longer and is temporarily fastened. This state can be found from FIGS. 3(a) and 4(a). Although not shown, the upper housing 30 is also prevented from being separated from the main housing 10 by the separation prevention portions provided in the main housing 10 and the upper housing 30.

When the temporary assembly is completed as described above, secondary assembly can be prevented from being undesirably performed by external force because the support bars 16 of the main housing 10 support the upper housing 30, and the temporarily assembled state can be simply released by elastically deforming the support bars 16 in a direction away from the main housing 10.

In particular, in the present embodiment, the task of releasing the temporary assembly by elastically deforming the support bars 16, provided on outsides of the main housing 10 surrounding the outer surfaces of the upper housing 30, outward can be intuitively and easily understood, and thus the task can be easily performed even when the worker is not skilled.

In this state, the worker mounts electric/electronic parts in the first containing space 11 of the main housing 10 and the second containing space 31 of the upper housing 30. When the second terminal Tb of FIGS. 7(a), 7(b), and 8 is taken as an example, the second terminal Tb is moved from the lower portion of the main housing 10 to the upper portion thereof, and is then inserted into the first reception hole 11' of the first containing space 11.

Furthermore, in this process, when part of the terminal body Tb2 of the second terminal Tb exits the first reception hole 11,' the lance Tb2 of the second terminal Tb is elastically deformed, inserted into the second reception hole 31' of the upper housing 30, restored to its original form, and then caught on the temporary fastening projection 32. In this case, the second terminal Tb is prevented from being separated in a downward direction, and is maintained in the state of being caught on the temporary fastening projection 32.

In this state, when the worker elastically deforms the support bar 16 of the main housing 10 in a direction away from the main housing 10, the temporary fastening portion 35 of the upper housing 30 is released from the state of being caught on the support bar 16, and thus the upper housing 30 may be further moved in the direction of the main housing 10.

Furthermore, when the upper housing 30 comes into close contact with the main housing 10, the fastening portions 37 of the upper housing 30 are hooked by the fastening tabs 17 of the main housing 10, thereby achieving secondary assembly. This state is illustrated in FIGS. 3(b) and 4(b). As shown in these drawings, when the fastening portions 37 are hooked by the fastening tabs 17, the upper housing 30 cannot be moved in a direction in which it is separated from the main housing 10, i.e., in an upward direction in FIG. 4(b).

In this process, the second terminal Tb is completely mounted. This state is illustrated in FIG. 8. FIG. 7(a) shows a temporarily assembled state, in which state the support member 12a provided in the main housing 10 is spaced apart from the terminal body Tb1 of the second terminal Tb. Furthermore, when the main housing 10 and the upper housing 30 are secondarily assembled, the main housing 10 and the upper housing 30 come into close contact and the support member 12a is moved to the terminal body Tb1 and comes into contact with the bottom of the terminal body Tb1, as shown in FIG. 8.

Accordingly, the second terminal Tb is naturally and completely mounted. In other words, this means that when the main housing 10 and the upper housing 30 are secondarily assembled, electric/electronic parts are completely mounted without a need for the worker to personally and completely mount the electric/electronic part (terminals).

Meanwhile, referring to FIGS. 5(a) and 5(b), the process of inserting the first terminal Ta into the main housing 10 is described. The first terminal Ta is moved along the first reception hole 11' of the main housing 10. In this case, the first reception hole 11' has a simple square cross section, and thus the first terminal Ta may be easily inserted without interference.

Furthermore, when the first terminal Ta approaches the exit of the first reception hole 11,' the first terminal Ta is guided by the inclined guide surface 12a' of the support member 12a provided in the first reception hole 11,' is tilted to one side (a right side in FIG. 5(b)), and is then moved.

When the first terminal Ta continues to be moved upward, the terminal body Ta1 of the first terminal Ta exits the first reception hole 11,' and is moved to the temporary fastening projection 32 of the second reception hole 31.' When the lance Ta2 of the first terminal Ta is caught on the temporary fastening projection 32, the temporary fastening of the first terminal Ta is completed.

As described above, when the main housing 10 and the upper housing 30 are secondarily assembled, the support member 12a is moved to the bottom of the terminal body Ta1 of the first terminal Ta and supports it. As shown in FIG. 5(a), the support member 12a has a width larger than that of the terminal body Ta1 of the first terminal Ta, the first terminal Ta may be securely and stably fastened between the main housing 10 and the upper housing 30.

Finally, the worker mounts the fuses F and the relays R in the second containing space 31 of the upper housing 30. In this process, some of the fuses F and the relays R come into contact with the first connection members Ta3 and Tb3 of the first terminal Ta and the second terminal Tb, and are thus electrically connected thereto.

The above-described block for a vehicle according to the present invention is expected to achieve the following advantages.

According to the present invention, when the main housing and the upper housing constituting the block for a vehicle are temporarily assembled, the support bars of the main housing support the upper housing, with the result that secondary assembly is prevented from being undesirably performed by external force and also that the efficiency of assembly is improved because a temporarily assembled state can be easily released by elastically deforming the support bars in directions away from the main housing.

In particular, the task of releasing temporary assembly by further elastically deforming the support bars, provided on outsides of the main housing surrounding the outer surfaces of the upper housing, outward can be intuitively and simply understood even by a worker who is not skilled, and thus the efficiency of the assembly of the block for a vehicle is improved.

According to the present invention, the assembly of the block for a vehicle is performed through temporary assembly and secondary assembly. When secondary assembly is completed after electric/electronic parts, such as a terminal, have been inserted into the block for a vehicle in a temporarily assembled state, possibility that the electric/electronic parts are damaged due to interference during the assembly of housing parts is reduced. Simultaneously, during the secondary assembly, the electric/electronic parts are also naturally supported by the support members of the main housing and are completely mounted, and thus there is no need for a worker to personally mount the plurality of electric/electronic parts with accurate and strong force, thereby improving the efficiency of work.

Furthermore, according to the present invention, the shape of the cross section of the reception holes formed in the block for a vehicle and configured to receive electric/electronic parts is simplified to a square shape and is formed to be larger than the widths of the electric/electronic parts, and thus the electric/electronic parts can be easily inserted without interference. Furthermore, a support member provided on one side of the exit of each of the reception holes naturally guides a corresponding electric/electronic part to one side, supports one of the exiting electric/electronic part and prevents the electric/electronic part from being separated, thereby improving the efficiency of the mounting of the electric/electronic part.

Furthermore, since the shape of the cross section of the reception holes is simplified, the size of the support members supporting electric/electronic parts can be increased, and thus the electric/electronic parts are more stably supported, thereby reducing the movement of the electric/electronic parts.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A block for a vehicle, comprising: a main housing configured such that a first containing space in which a plurality of parts is mounted is formed therein; an upper housing configured such that at least a part thereof is inserted into the main housing and a second containing space in which a plurality of parts is mounted is formed therein; support bars configured to protrude upward from edges of the main housing surrounding the upper housing; and to be elastically deformable in a direction away from the main housing; and temporary fastening portions configured to protrude downward from edges of the upper housing, and configured such that one end of each of the temporary fastening portions is selectively seated on an upper portion of a corresponding one of the support bars; wherein; when the temporary fastening portions are respectively seated on upper portions of the support bars, the upper housing is temporarily fastened to the main housing, and, when the support bars are elastically deformed, the temporary fastening portions exit a state of being seated on the upper portions of the support bars, and thus the temporary fastening is released, wherein the support bars are provided with respective support protrusions protruding in a direction toward a center of the main housing, the temporary fastening portions are provided with respective temporary fastening protrusions in a direction away from the upper housing, and thus the upper housing is temporarily fastened to the main housing when the temporary fastening protrusions are seated on the support protrusions, and wherein at least a part of each of the support bars is surrounded with an interference prevention portion provided on an outer surface of the main housing.

2. The block for a vehicle of claim 1, wherein elastically deformable fastening tabs are provided on edges of the main housing, fastening portions configured to be selectively hooked by the fastening tabs protrude from the upper housing, the main housing and the upper housing are secondarily fastened to each other when the fastening portions are hooked by the fastening tabs, and a location at which the fastening portions are hooked by the fastening tabs is formed to be closer to a bottom of the main housing than a location at which the temporary fastening portions are caught on the support bars.

3. The block for a vehicle of claim 2, wherein the fastening tabs are provided on sides of the main housing on which the support bars are not provided, and the fastening portions are provided on sides of the upper housing on which the temporary fastening portions are not provided.

4. The block for a vehicle of claim 1, wherein first reception holes are formed in the main housing, second reception holes are formed in the upper housing, the first reception holes communicate with the second reception holes, and a temporary fastening projection configured such that a lance of an electric/electronic part is caught and temporarily fastened in a state in which the temporary fastening portions have been caught on the support bars is provided on one side of each of the second reception holes.

5. The block for a vehicle of claim 4, wherein a support member configured to support a body of the electric/electronic part is provided on an edge of one side of each of the first reception holes, and supports and fastens one side of the body of the electric/electronic part when the fastening portions are hooked by the fastening tabs.

6. The block for a vehicle of claim 4, wherein a support member configured to support a body of the electric/electronic part is provided on an edge of one side of each of the first reception holes which is open toward the upper housing, and the support member protrudes above an open exit of the first reception hole and also protrudes in a direction in which the support member reduces a width of the first reception hole.

7. The block for a vehicle of claim 6, wherein a cross section of the first reception holes is formed in a square shape, and a support member provided on one side of each of the first reception holes is formed to have a width equal to or larger than that of the body of the electric/electronic part.

8. The block for a vehicle of claim 7, wherein an inclined guide surface is formed on a lower surface of each of the support members located inside the first reception holes, and guides the electric/electronic part along an inner surface of a corresponding one of the first reception holes.

9. The block for a vehicle of claim 1, wherein a bus bar is mounted inside the upper housing, and a bus bar shield portion is provided on the main housing and shields the bus bar so that the bus bar is not exposed when the main housing and the upper housing are assembled together.

10. The block for a vehicle of claim 1, wherein a connector assembly portion is formed in a corner portion of the main housing, and is open downward in a direction in which the main housing and the upper housing are assembled together.

* * * * *